US012237619B2

(12) United States Patent
Wang et al.

(10) Patent No.: US 12,237,619 B2
(45) Date of Patent: Feb. 25, 2025

(54) RECEPTACLE CONNECTOR WITH FLEXIBLE INSERTION DIRECTIONS

(71) Applicant: DONGGUAN LEADER PRECISION INDUSTRY CO., LTD., Dongguan (CN)

(72) Inventors: Bo Wang, Dongguan (CN); Jinqi Li, Dongguan (CN); Jiamei Wan, Dongguan (CN)

(73) Assignee: DONGGUAN LEADER PRECISION INDUSTRY CO., LTD., Dongguan (CN)

( * ) Notice: Subject to any disclaimer, the term of this patent is extended or adjusted under 35 U.S.C. 154(b) by 427 days.

(21) Appl. No.: 17/695,504

(22) Filed: Mar. 15, 2022

(65) Prior Publication Data

US 2022/0376439 A1 Nov. 24, 2022

(30) Foreign Application Priority Data

May 20, 2021 (CN) ........................ 202121091843.9

(51) Int. Cl.

| | |
|---|---|
| ***H01R 13/502*** | (2006.01) |
| ***H01R 13/627*** | (2006.01) |
| ***H01R 13/64*** | (2006.01) |
| ***H01R 13/66*** | (2006.01) |
| ***H01R 24/58*** | (2011.01) |

(52) U.S. Cl.

CPC ........... *H01R 13/64* (2013.01); *H01R 13/502* (2013.01); *H01R 13/6273* (2013.01); *H01R 13/665* (2013.01); *H01R 24/58* (2013.01)

(58) Field of Classification Search

CPC .. H01R 13/64; H01R 13/502; H01R 13/6273; H01R 13/665; H01R 24/58; H01R 13/405; H01R 24/60; H01R 12/712; H01R 13/6581

See application file for complete search history.

(56) References Cited

U.S. PATENT DOCUMENTS

| | | | | |
|---|---|---|---|---|
| 4,978,317 A | 12/1990 | Pocrass | | |
| 5,685,731 A | 11/1997 | Lin | | |
| 2012/0115364 A1* | 5/2012 | Han | .................. | H01R 13/6596 439/607.55 |
| 2015/0194775 A1* | 7/2015 | Lin | .................... | H01R 13/6273 439/668 |

* cited by examiner

*Primary Examiner* — Abdullah A Riyami
*Assistant Examiner* — Nelson R. Burgos-Guntin
(74) *Attorney, Agent, or Firm* — Birch, Stewart, Kolasch & Birch, LLP

(57) ABSTRACT

A receptacle connector includes an insulating portion, a receptacle terminal module mounted to the insulating portion, a metal shell enclosing the insulating portion, and a receptacle circuit board. The insulating portion includes a receiving space and a mating space extending from the receiving space. The mating space extends through the insulating portion to form a mating port. The receptacle terminal module includes a first terminal module and a second terminal module. The first terminal module and the second terminal module have a same structure, and are symmetrically arranged on opposite sides of the mating space. The first terminal module and the second terminal module are electrically connected to the receptacle circuit board.

20 Claims, 15 Drawing Sheets

RECEPTACLE CONNECTOR WITH FLEXIBLE INSERTION DIRECTIONS

CROSS-REFERENCE TO RELATED APPLICATION

This patent application claims priority of a Chinese Patent Application No. 202121091843.9, filed on May 20, 2021 and titled "RECEPTACLE CONNECTOR", the entire content of which is incorporated herein by reference.

TECHNICAL FIELD

The present disclosure relates to a receptacle connector, which belongs to a field of electrical connectors.

BACKGROUND

With the rapid development of information technology, the application of electronic and information products has become more and more extensive. The advancement of computer systems and related peripheral industries is even more rapid. The proliferation of computers, coupled with the rapid development of network technology, enables people to quickly obtain the information they need through the network, and also allows people to access diversified information services. The development of computer networks provides a more convenient and comfortable living environment for human beings.

RJ45 plug connectors and RJ45 receptacle connectors are important mating components for network connection. The RJ45 plug connector is used to cooperate with the RJ45 receptacle connector for signal output. With the development of diversification and multi-function, the eight pins of the RJ45 plug connector and RJ45 receptacle connector on the market are all arranged side by side, so only a single direction can be plugged and unplugged. With the emergence of more and more multifunctional connectors and the increasing demand of consumers for convenience, connectors which can be inserted in either a forward direction or a reversed insertion are increasing in urgent need of development.

SUMMARY

An object of the present disclosure is to provide a receptacle connector into which a corresponding mating plug connector can be inserted along either a forward direction or a reversed direction, thereby improving the convenience of use.

In order to achieve the above object, the present disclosure adopts the following technical solution: a receptacle connector, including: an insulating portion, the insulating portion defining a receiving space and a mating space in communication with the receiving space, the mating space extending through the insulating portion so as to form a mating port; a receptacle terminal module, the receptacle terminal module being mounted to the insulating portion, the receptacle terminal module including a first terminal module and a second terminal module, the first terminal module and the second terminal module having a same structure and being symmetrically arranged on opposite sides of the mating space along a first direction; a metal shell, the metal shell enclosing the insulating portion; and a receptacle circuit board, the first terminal module and the second terminal module being electrically connected to the receptacle circuit board.

In order to achieve the above object, the present disclosure adopts the following technical solution: a receptacle connector, including: an insulating portion, the insulating portion defining a receiving space and a mating space in communication with the receiving space, the mating space extending through the insulating portion so as to form a mating port; a receptacle terminal module, the receptacle terminal module being mounted to the insulating portion, the receptacle terminal module including a first terminal module and a second terminal module, the first terminal module and the second terminal module being arranged on opposite sides of the mating space, the first terminal module including a first terminal base and a plurality of first receptacle terminals fixed to the first terminal base, the second terminal module including a second terminal base and a plurality of second receptacle terminals fixed to the second terminal base; and a receptacle circuit board, the first receptacle terminals and the second receptacle terminals being electrically connected to the receptacle circuit board; wherein each first receptacle terminal includes a first mating portion protruding into the mating space, and each second receptacle terminal includes a second mating portion protruding into the mating space; and wherein the first mating portions of the first receptacle terminals and the second mating portions of the second receptacle terminals are symmetrically arranged on opposite sides of the mating space along a first direction.

The first terminal module and the second terminal module of the receptacle connector of the present disclosure have the same structure, and are symmetrically arranged on opposite sides of the mating space. As a result, when a corresponding mating plug connector is inserted into the receptacle connector of the present disclosure, there is no need to manually distinguish the insertion direction, thereby a blind insertion can be realized and the convenience in use is improved.

DETAILED DESCRIPTION

Figure 1:
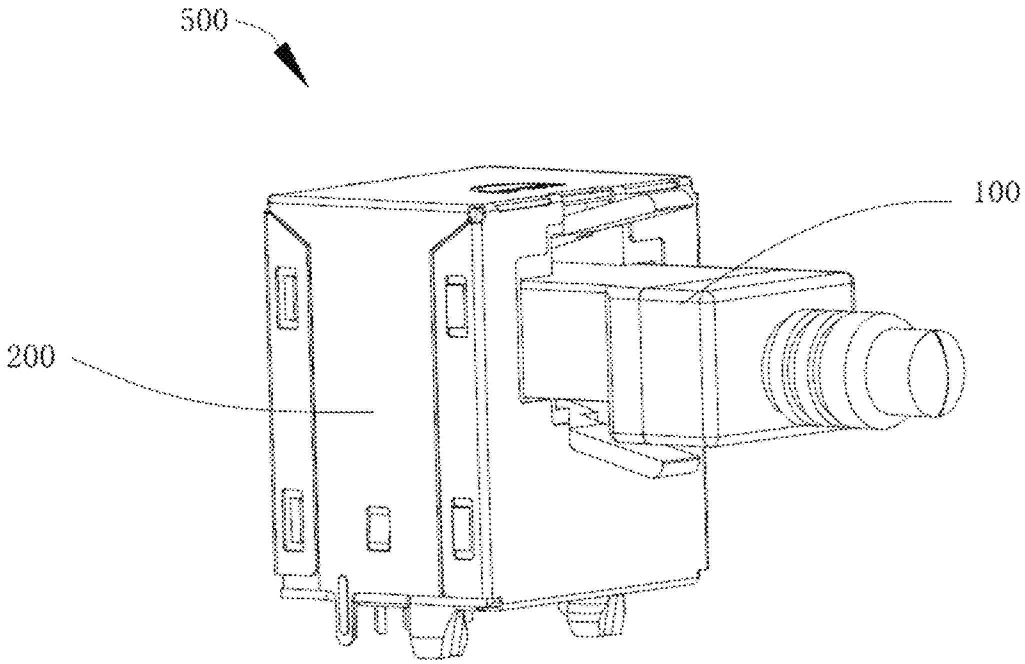
FIG. 1 is a perspective view of a plug connector and a receptacle connector mated with each other in accordance with an embodiment of the present disclosure.
Figure 2:
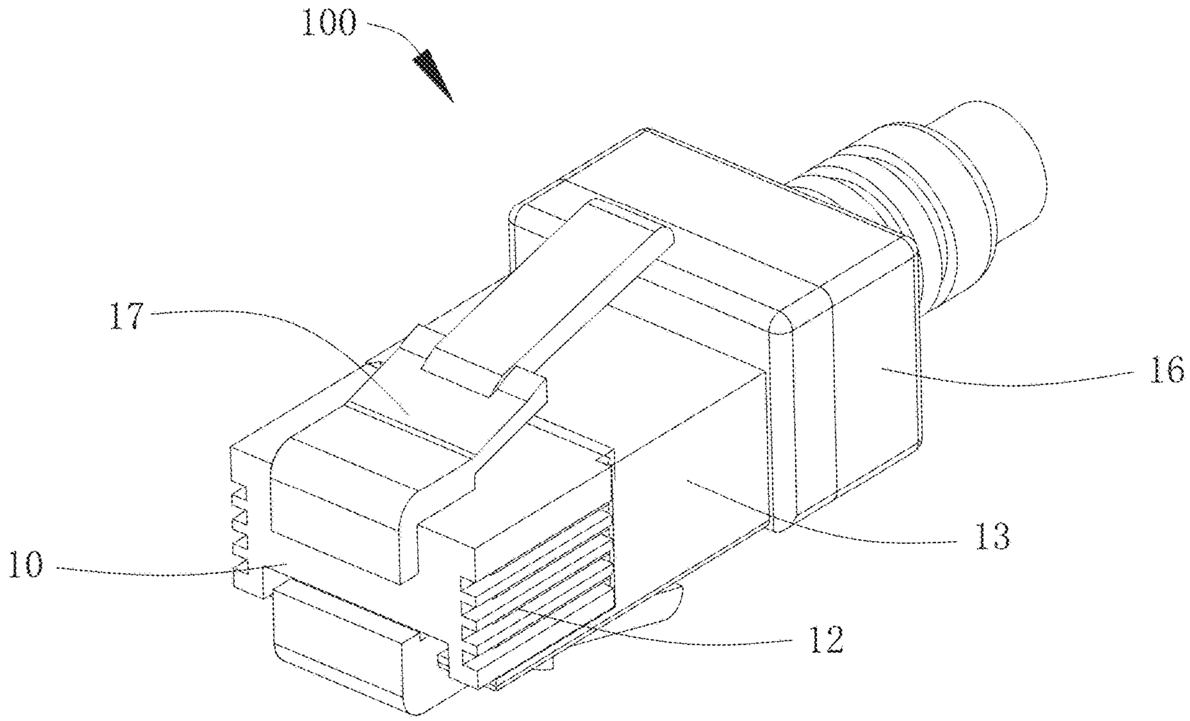
FIG. 2 is a perspective view of the plug connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 15, the present disclosure discloses a connector assembly 500 including a plug connector 100 and a receptacle connector 200 which are mated with each other.

Figure 3:
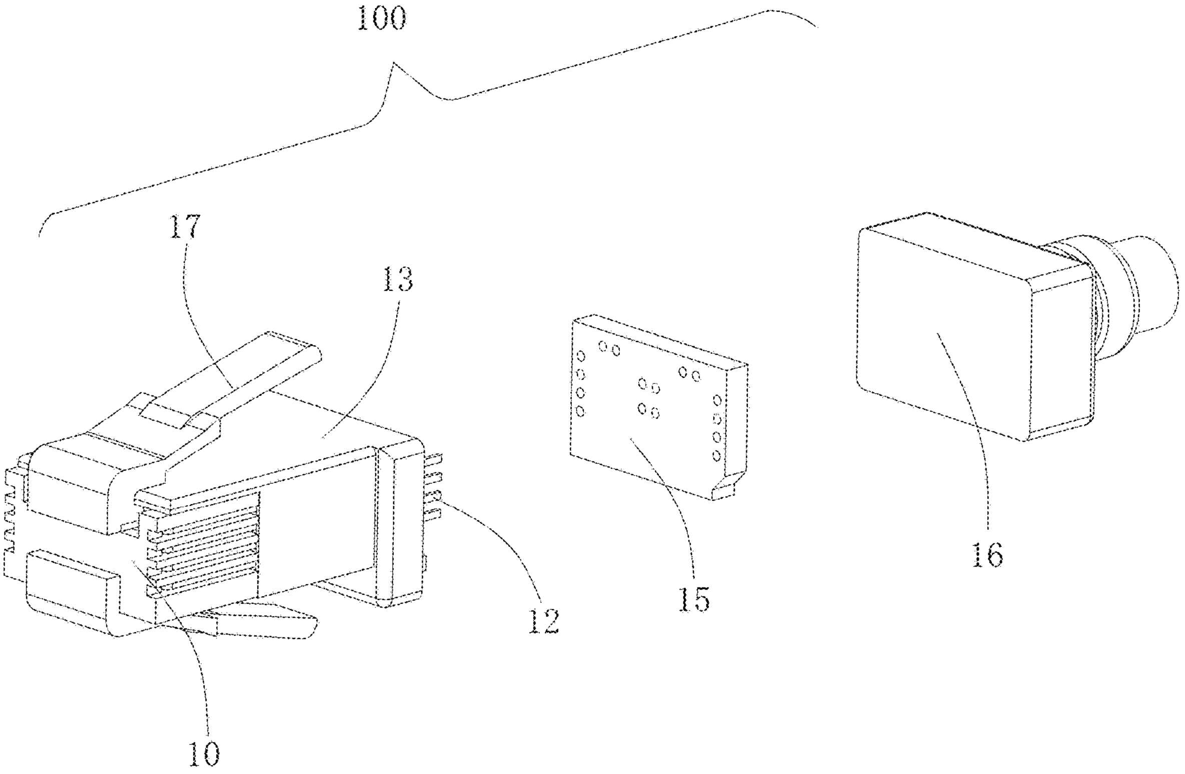
FIG. 3 is a partially exploded perspective view of FIG. 2.
Figure 4:
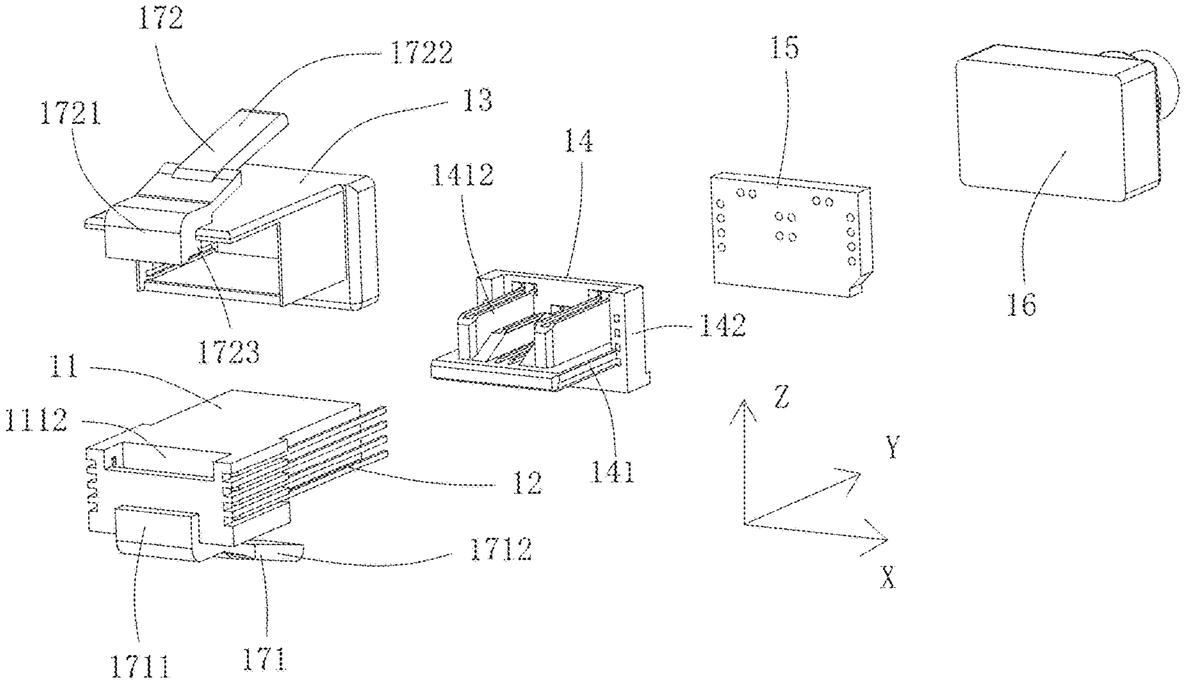
FIG. 4 is a further perspective exploded view of FIG. 3.
Figure 7:
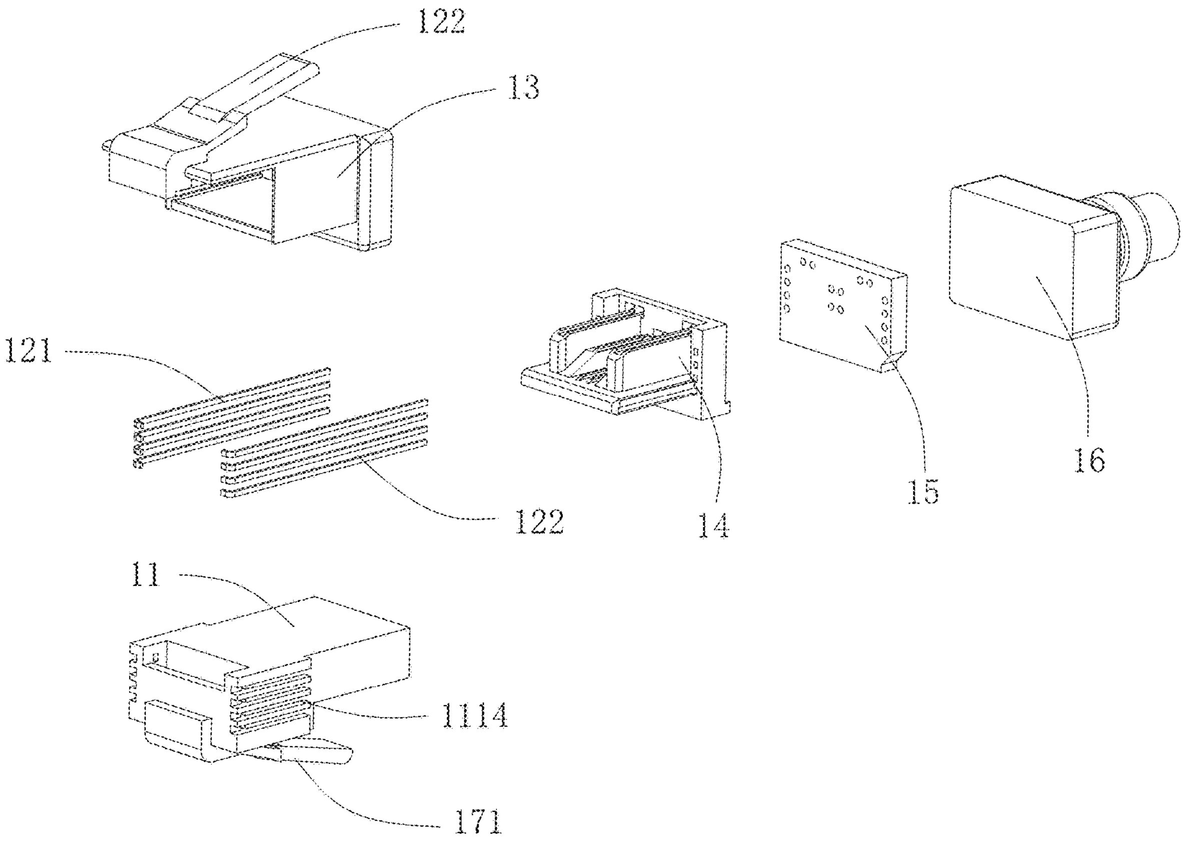
FIG. 7 is a perspective exploded view of FIG. 6 from another angle.
Figure 8:
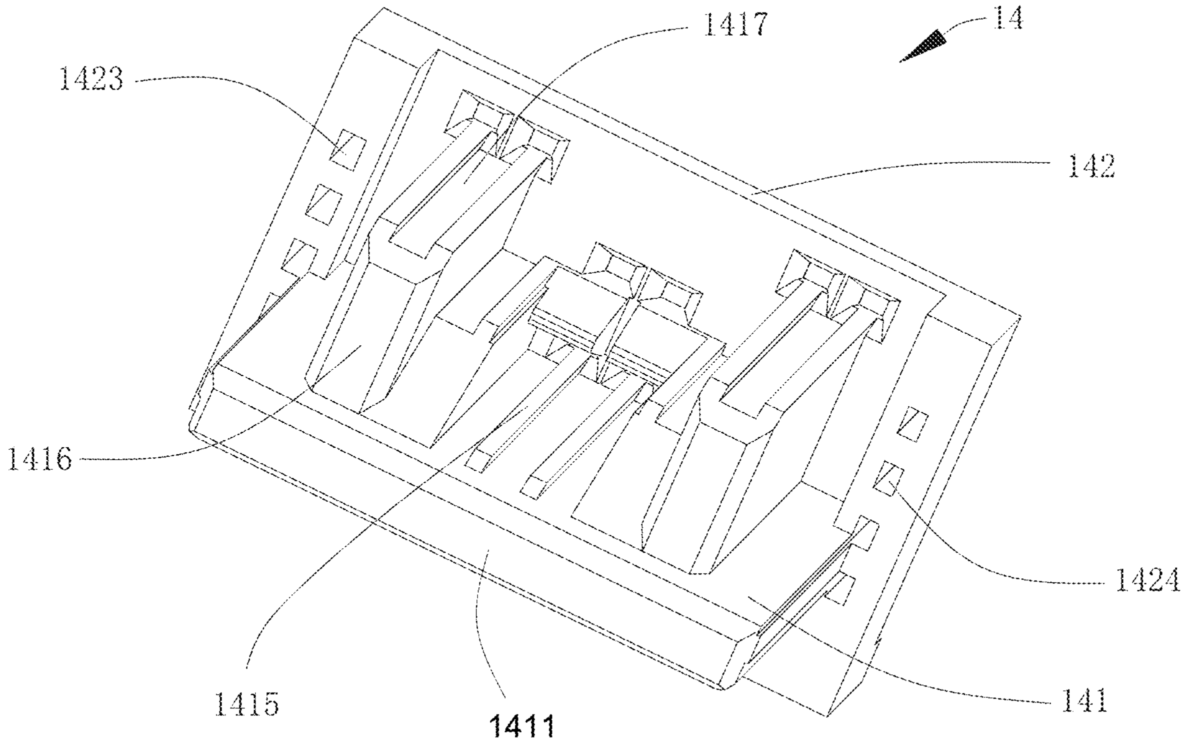
FIG. 8 is a perspective schematic view of a retaining body of the plug connector of the present disclosure.
Figure 9:
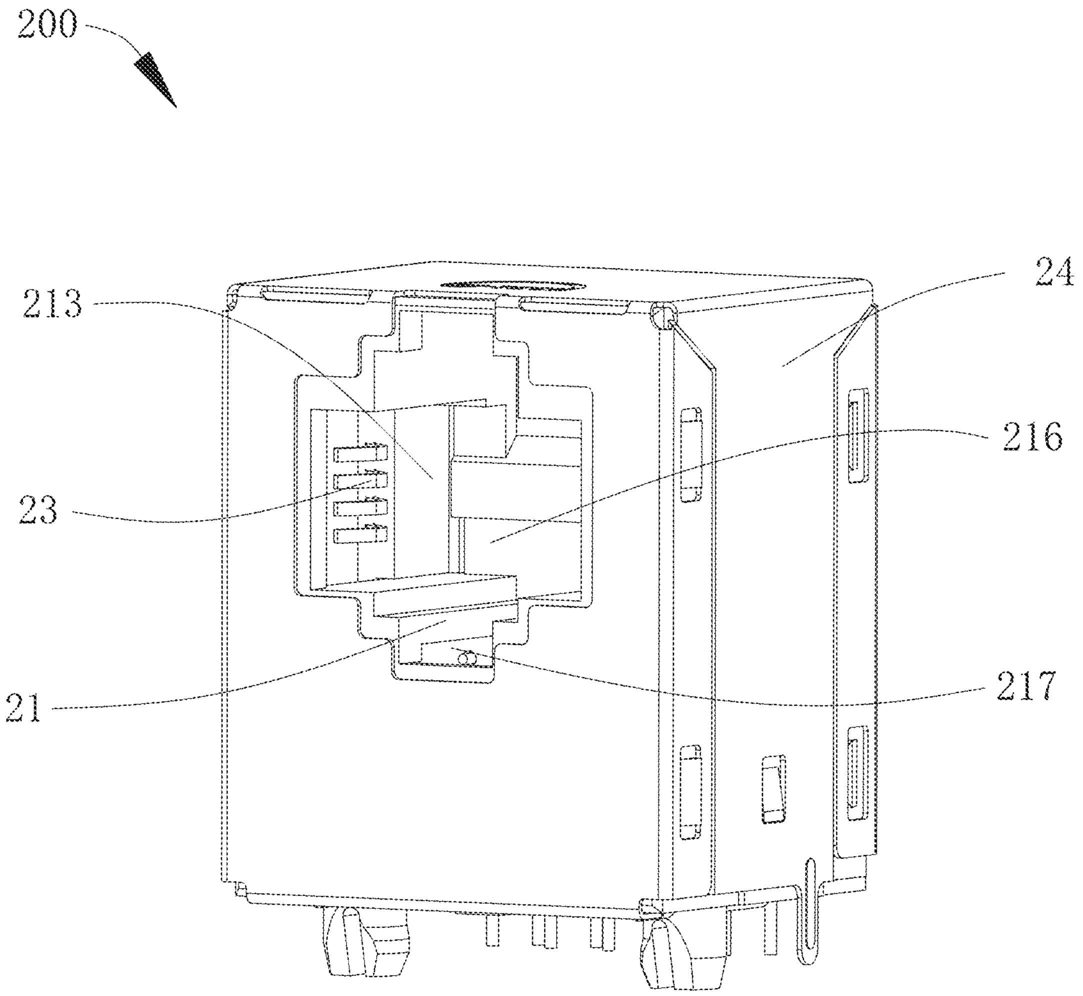
FIG. 9 is a perspective schematic view of the receptacle connector of the present disclosure.
Figure 10:
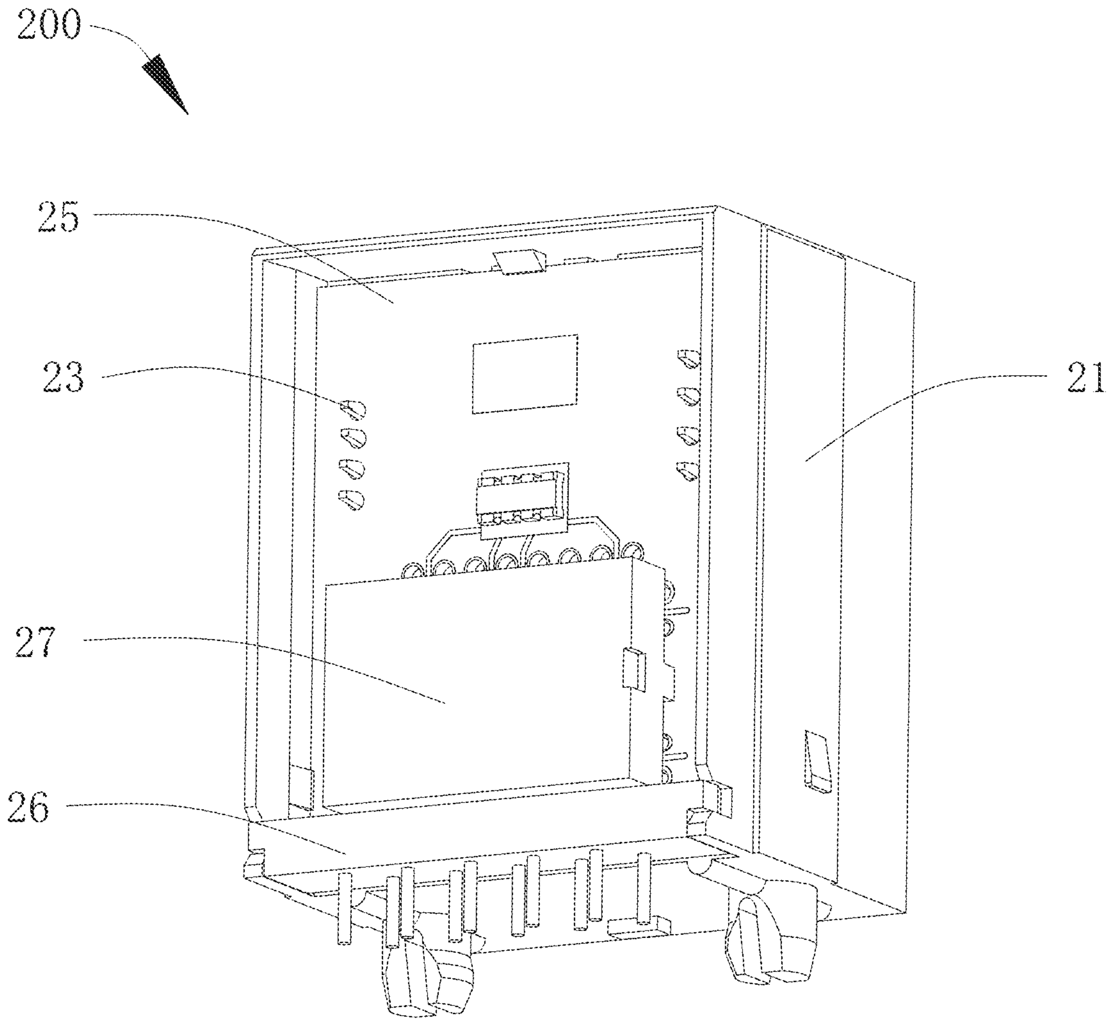
FIG. 10 is a perspective schematic view of the receptacle connector of the present disclosure with a metal shell removed therefrom.
Figure 11:
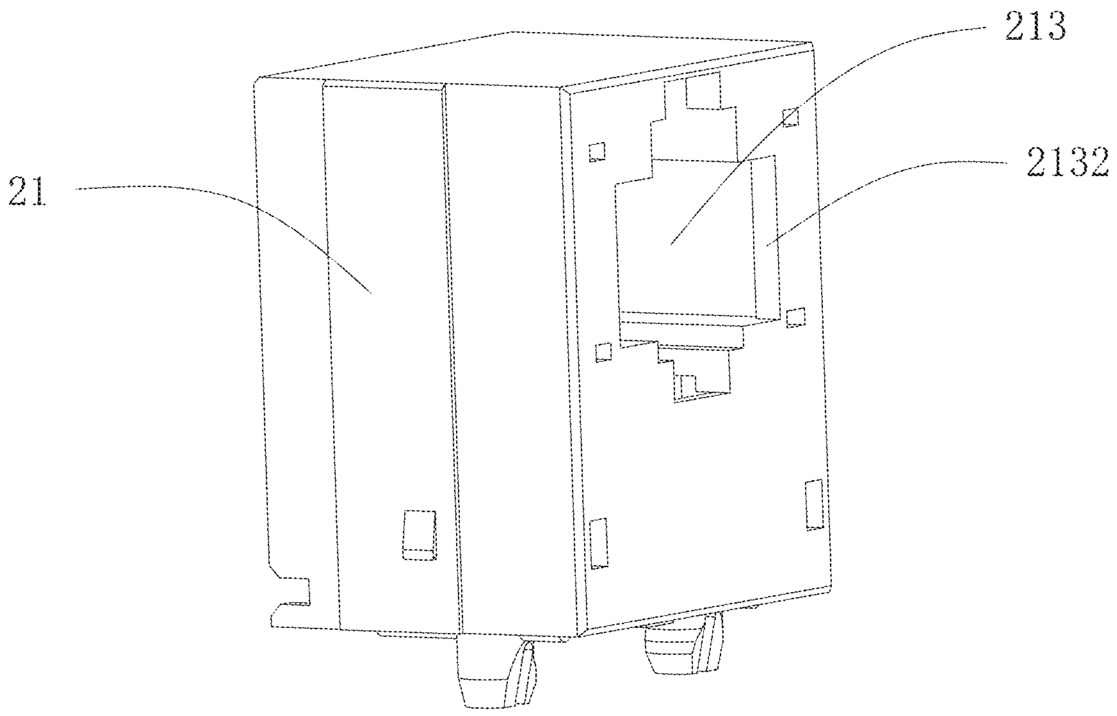
FIG. 11 is a perspective view of FIG. 10 from another angle.

Referring to FIGS. 3 and 4, the plug connector 100 includes an insulating body 11, a plug terminal module 12 accommodated in the insulating body 11, an insulating housing 13 sleeved on a periphery of the insulating body 11, and a retaining body 14 assembled on one side of the insulating body 11. In some embodiments, the plug connector 100 further includes a plug circuit board 15 and a stress relief portion 16 on one side of the retaining body 14. Referring to FIG. 7, the plug terminal module 12 includes a plurality of first plug terminals 121 and a plurality of second plug terminals 122. The first plug terminals 121 and the second plug terminals 122 have the same structure and number. The first plug terminals 121 and the second plug terminals 122 are symmetrically arranged on opposite sides of the insulating body 11 along a first direction, for example: a left-right direction.

For better understanding the present disclosure, all the descriptions concerning directions of the plug connector 100 in the present disclosure refer to FIG. 4. An extending direction of the X-axis is a left-right direction of the plug connector 100, and it is defined that a positive direction of the X-axis is a right direction. An extending direction of the Y-axis is a front-back direction of the plug connector 100. The extending direction of the Y-axis is a plugging and unplugging direction of the plug connector 100, and it is defined that a positive direction of the Y-axis is a rear direction. An extending direction of the Z-axis is a top-bottom direction of the plug connector 100, and it is defined that a positive direction of the Z-axis is an upward direction.

Figure 5:
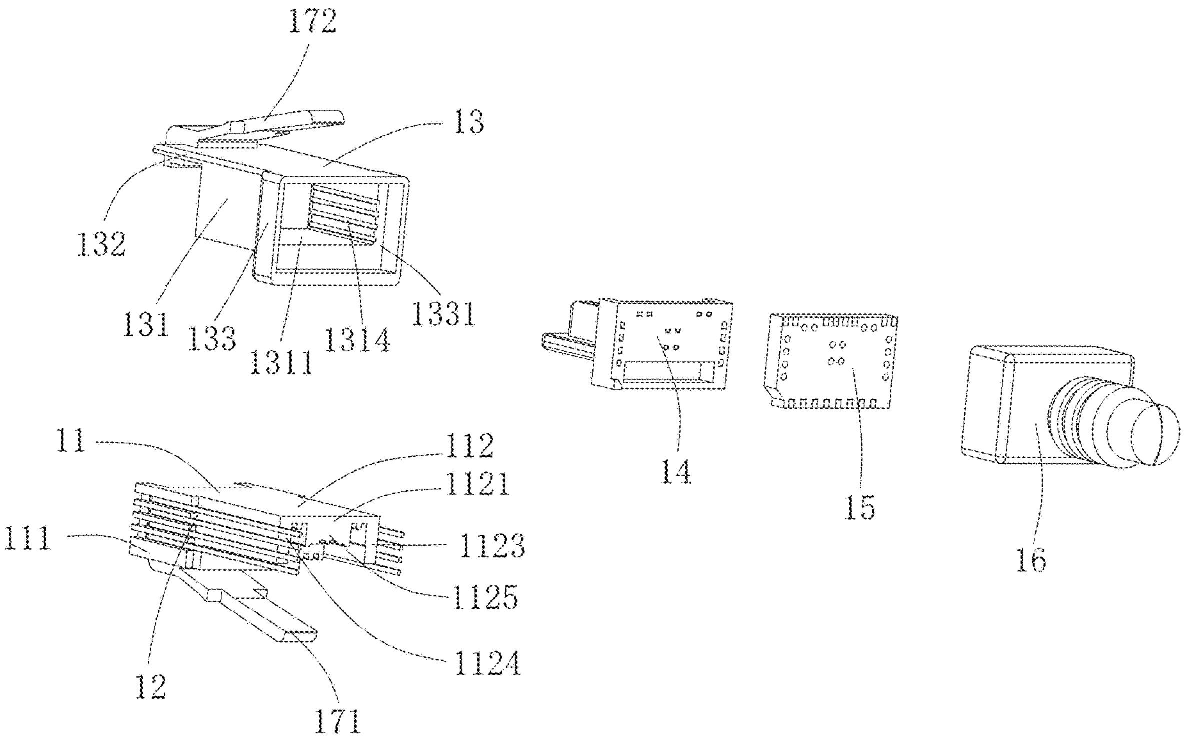
FIG. 5 is a perspective exploded view of FIG. 4 from another angle.

Referring to FIG. 5, the insulating body 11 includes a first horizontal portion 111 and a second horizontal portion 112 extending backwardly from the first horizontal portion 111. A top surface of the first horizontal portion 111 and a top surface of the second horizontal portion 112 are located in a same plane. In the top-bottom direction and the left-right direction, a dimension of the second horizontal portion 112 is smaller than that of the first horizontal portion 111.

Figure 6:
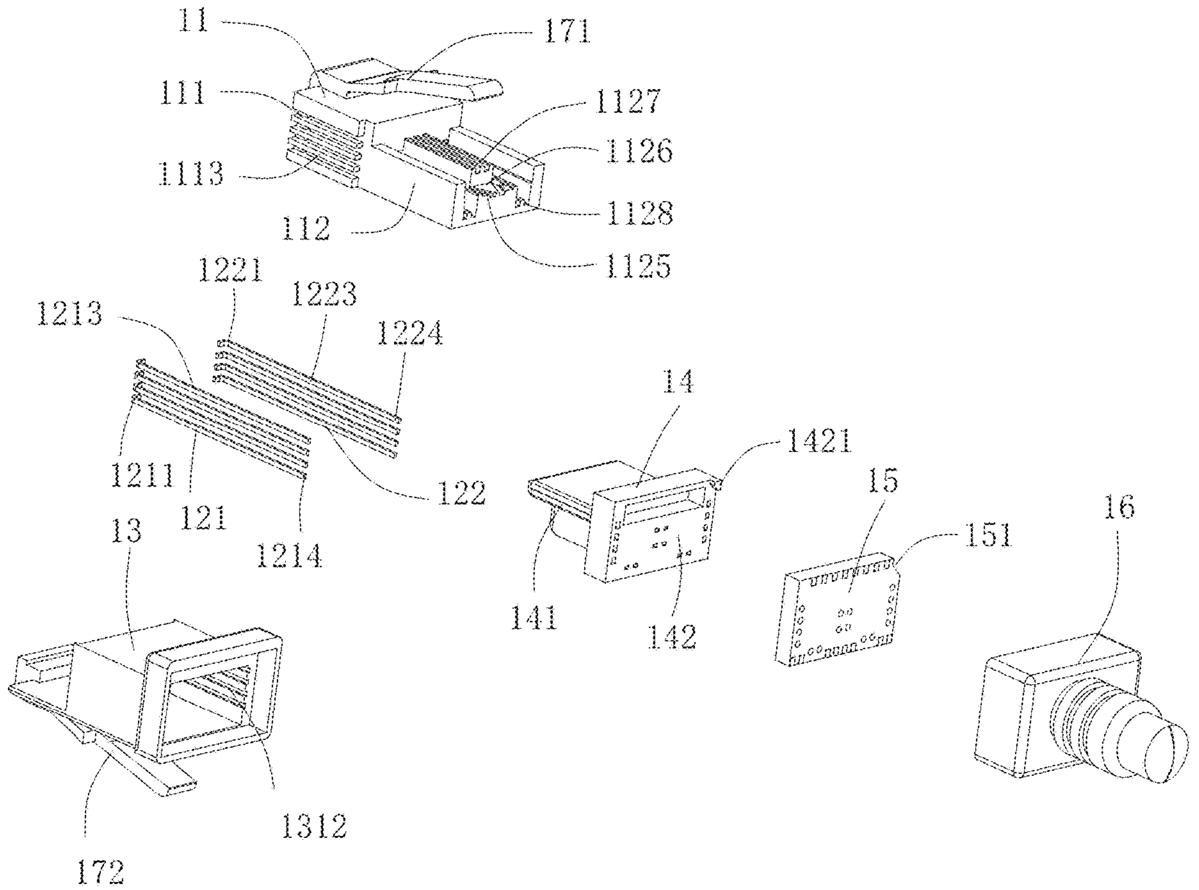
FIG. 6 is a further perspective exploded view of FIG. 5.

As shown in FIGS. 5 and 6, the insulating housing 13 is sleeved on a periphery of the second horizontal portion 112 of the insulating body 11, and partially extends forwardly to cover a top surface of the first horizontal portion 111 of the insulating body 11. The insulating housing 13 includes a receiving portion 131 surrounding the second horizontal portion 112, a flat portion 132 extending forwardly from a top of the receiving portion 131, and an accommodating portion 133 extending backwardly from the receiving portion 131.

The flat portion 132 covers a top surface of the first horizontal portion 111. Each of the receiving portion 131 and the accommodating portion 133 has a hollow cuboid shape, and includes a first channel 1311 and a second channel 1331 extending in the front-back direction. A cross section of the first channel 1311 is smaller than a cross section of the second channel 1331. The second horizontal portion 112 of the insulating body 11 is accommodated in the first channel 1311.

Referring to FIGS. 4 to 8, the retaining body 14 includes a positioning portion 141 and a limiting portion 142 extending backwardly from the positioning portion 141. As viewed from the front-back direction, the limiting portion 142 protrudes beyond the positioning portion 141 in four directions: top, bottom, left, and right. That is, in the left-right direction and the top-bottom direction, a dimension of the limiting portion 142 is larger than that of the positioning portion 141. The positioning portion 141 is installed to the second horizontal portion 112 of the insulating body 11. The limiting portion 142 is accommodated in the accommodating portion 133 of the insulating housing 13.

Specifically, the second horizontal portion 112 of the insulating body 11 includes a top wall 1121, a second side wall 1124, and a first guide member 1125 extending downwardly from the top wall 1121. The first side wall 1123 and the second side wall 1124 extend downwardly from left and right sides of the top wall 1121, respectively. The first guide member 1125 is located between the first side wall 1123 and the second side wall 1124. Correspondingly, the positioning portion 141 of the retaining body 14 includes a bottom wall 1411 and a second guide member 1412 extending upwardly from the bottom wall 1411. The second guide member 1412 is adapted to mate with the first guide member 1125 of the second horizontal portion 112.

In the illustrated embodiment of the present disclosure, the first guide member 1125 includes a first protruding rib 1126 extending downwardly from the top wall 1121, a plurality of first guide grooves 1127 recessed upwardly from a bottom surface of the first protruding rib 1126, and a plurality of first guide rails 1128 protruding downwardly from the top wall 1121. The first guide grooves 1127 are located in a middle of the first guide rails 1128. The second guide member 1412 includes a plurality of second guide rails 1415 extending upwardly from the bottom wall 1411, a plurality of second protruding ribs 1416 extending upwardly from the bottom wall 1411, and a plurality of second guide grooves 1417. Each second guide groove 1417 is recessed downwardly from a top surface of the second protruding rib 1416. The second guide rails 1415 are located between the second guide grooves 1417. The first guide grooves 1127, the first guide rails 1128, the second guide grooves 1417, and the second guide rails 1415 all extend in the front-back direction. The second guide grooves 1417 are adapted to receive the first guide rails 1128, and the second guide rails 1415 are adapted to be received in the first guide grooves 1127, thereby ensuring that the retaining body 14 can be accurately assembled to the insulating body 11.

In the illustrated embodiment of the present disclosure, the number of each of the first guide grooves 1127, the first guide rails 1128, the second guide grooves 1417, and the second guide rails 1415 is two. The first guide rails 1128 are located on opposite sides of the first guide grooves 1127. The second guide grooves 1417 are located on opposite sides of the second guide rails 1415. The two second guide rails 1415 are mated with the two first guide grooves 1127, respectively. The two second guide grooves 1417 are mated with the two first guide rails 1128, respectively. In other embodiments, the positions and number of the guide rails and the guide grooves can be set according to actual usage requirements, as long as the guide rails and the guide grooves can mate with each other to accurately assemble the retaining body 14 to the insulating body 11.

The plug circuit board 15 is assembled to a rear end surface of the retaining body 14. In order to facilitate the installation and prevent the wrong installation direction, the rear end surface of the limiting portion 142 of the retaining body 14 is provided with a foolproof protrusion 1421. The plug circuit board 15 is provided with a fool-proof notch 151 which is mated with the fool-proof protrusion 1421.

Referring to FIGS. 4 and 5, the plug connector 100 further includes a locking member 17 which is adapted to ensure that the plug connector 100 and the receptacle connector 200 can be firmly connected together. Specifically, the locking member 17 includes a first locking member 171 provided on the insulating body 11 and a second locking member 172 provided on the insulating housing 13. The first locking member 171 is connected to the insulating body 11. The second locking member 172 is connected to the insulating housing 13. The first locking member 171 and the second locking member 172 are symmetrically arranged along a second direction, for example a top-bottom direction perpendicular to the first direction.

The first locking member 171 includes a first fixing portion 1711 fixedly connected to the insulating body 11 and a first locking portion 1712 extending backwardly and obliquely downward from the first fixing portion 1711. Furthermore, the first fixing portion 1711 is fixedly connected to a front end surface and a lower end surface of the first horizontal portion 111 of the insulating body 11. The first locking portion 1712 is located below the first horizontal portion 111.

The second locking member 172 includes a second fixing portion 1721 fixedly connected to the insulating housing 13, a second locking portion 1722 obliquely extending backwardly and obliquely upward from the second fixing portion 1721, and an abutting portion 1723 extending backwardly from the second fixing portion 1721. Furthermore, the second fixing portion 1721 is fixedly connected to an upper end surface and a front end surface of the flat plate portion 132 of the insulating housing 13. The second locking portion 1722 is located above the flat portion 132. The abutting portion 1723 is located below the flat portion 132. The flat portion 132 is sandwiched between the second fixing portion 1721 and the abutting portion 1723. Correspondingly, the first horizontal portion 111 of the insulating body 11 has an abutting groove 1112 which extends upwardly and forwardly through the first horizontal portion 111. The abutting portion 1723 cooperates with the abutting groove 1112 to prevent the insulating housing 13 from moving backwardly relative to the insulating body 11.

In the illustrated embodiment of the present disclosure, the first locking member 171 and the insulating body 11 are integrally formed, and the second locking portion 1722 and the insulating housing 13 are integrally formed. It is understandable to those of ordinary skill in the art that in other embodiments, the first locking member 171 may be formed separately from the insulating body 11 and then fixed to the insulating body 11 through a connection method such as a locking or an interference fit. The second locking member 172 may be formed separately from the insulating housing 13 and then fixed to the insulating housing 13 through a connection method such as a locking or an interference fit.

Referring to FIGS. 4 to 8, the structure and number of the first plug terminals 121 and the second plug terminals 122 are the same. The first plug terminals 121 are arranged in a row along the vertical direction, and the second plug terminals 122 are arranged in the other row along the vertical direction. The first plug terminals 121 and the second plug terminals 122 are symmetrically arranged on left and right sides of the insulating body 11, respectively. The first plug terminals 121 and the second plug terminals 122 are located between the insulating body 11 and the insulating housing 13.

Furthermore, each first plug terminal 121 includes a first mating portion 1211, a first mounting portion 1213 extending horizontally and backwardly from the first mating portion 1211, and a first soldering portion 1214 extending horizontally and backwardly from the first mounting portion 1213. Each second plug terminal 122 includes a second mating portion 1221, a second mounting portion 1223 extending horizontally and backwardly from the second mating portion 1221, and a second soldering portion 1224 extending horizontally and backwardly from the second mounting portion 1223.

Correspondingly, left and right sides of the first horizontal portion 111 of the insulating body 11 are provided with a plurality of first terminal grooves 1113 and a plurality of second terminal grooves 1114, respectively. The first terminal grooves 1113 and the second terminal grooves 1114 extend horizontally in the front-back direction. The insulating housing 13 includes left and right inner side walls on opposite sides of the first channel 1311. The left and right inner side walls of the insulating housing 13 are provided with a plurality of first installation grooves 1312 and a plurality of second installation grooves 1314, respectively. The limiting portion 142 of the retaining body 14 is provided with a plurality of first through holes 1423 and a plurality of second through holes 1424 for the first mounting portions 1213 and the second mounting portions 1223 to pass through, respectively. The plug circuit board 15 is provided with a first soldering area 153 and a second soldering area 154 for soldering the first soldering portions 1214 and the second soldering portions 1224, respectively. The first mating portions 1211 and the second mating portions 1221 are accommodated in the first terminal grooves 1113 and the second terminal grooves 1114, respectively. The first mating portions 1211 and the second mating portions 1221 are exposed to an outside of the plug connector 100. The first mounting portions 1213 and the second mounting portions 1223 are received in the first installation grooves 1312 and the second installation grooves 1314, respectively. The first soldering portions 1214 and the second soldering portions 1224 extend backwardly beyond the limiting portion 142 and are soldered to the plug circuit board 15.

The first plug terminals 121 and the second plug terminals 122 extend horizontally in the front-back direction as a whole. Corresponding to the structure of the first plug terminals 121 and the second plug terminals 122, the first terminal grooves 1113, the first installation grooves 1312, the first through holes 1423, and the first soldering area 153 are aligned with each other in the front-back direction; and the second terminal grooves 1114, the second installation grooves 1314, the second through holes 1424, and the second soldering area 154 are aligned with each other in the front-back direction.

An assembly process of the plug connector 100 of the present disclosure is as follows. Firstly, the plug terminal module 12 is assembled to the insulating body 11. Secondly, the insulating housing 13 is sleeved forwardly on the periphery of the insulating housing 11 so as to form the plug head 10. The first locking portion 1712 and the second locking portion 1722 are symmetrically arranged on the upper and lower sides of the plug head 10. The front end surface of the receiving portion 131 of the insulating housing 13 abuts the rear end surface of the first horizontal portion 111 of the insulating body 11. The abutting portion 1723 of the second locking member 172 is received in the abutting groove 1112 of the insulating body 11. As a result, the mutual movement between the insulating housing 13 and the insulating body 11 is prevented. Thirdly, the retaining body 14 is assembled forwardly to the second horizontal portion 112 of the insulating body 11. The front end surface of the limiting portion 142 of the retaining body 14 abuts against the rear end surface of the receiving portion 131 of the insulating housing 13 so as to prevent the retaining body 14 from continuing to move forward. Then, the plug terminal module 12 and the plug circuit board 15 are soldered together. Finally, the stress relief portion 16 is assembled to the plug circuit board 15.

In the illustrated embodiment of the present disclosure, the insulating housing 13 is sleeved around the insulating body 11 so as to form the plug head 10. In other embodiments, the insulating body 11 and the insulating housing 13 may be integrally formed. The first locking member 171 and the second locking member 172 are symmetrically arranged on the upper and lower sides of the plug head 10. The first plug terminals 121 and the second plug terminals 122 are symmetrically arranged on the left and right sides of the plug head 10.

Referring to FIGS. 8 to 12, the receptacle connector 200 includes an insulating portion 21, a plurality of receptacle terminal modules 23 installed to the insulating portion 21, a metal shell 24 enclosing the insulating portion 21, a receptacle circuit board 25, an adapter module 26 electrically connected to the receptacle circuit board 25, and a plurality of electronic components 27.

Figure 12:
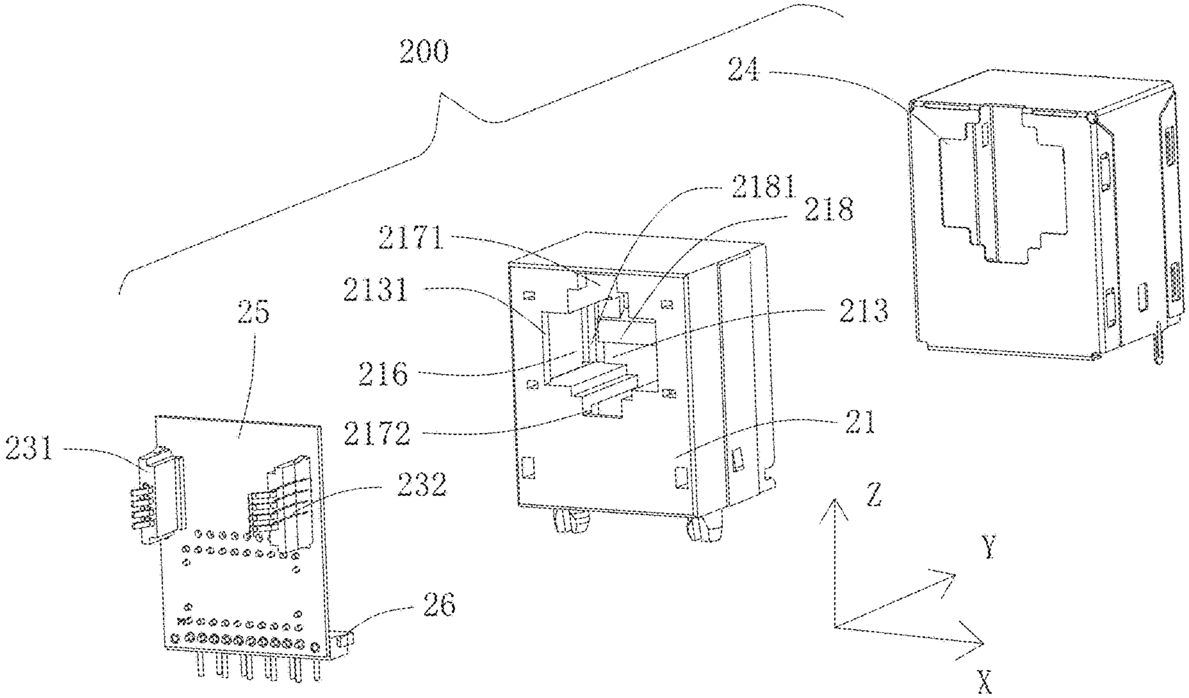
FIG. 12 is a perspective exploded view of FIG. 10.

For better understanding the present disclosure, all the descriptions concerning directions of the receptacle connector 200 in the present disclosure refer to FIG. 12. An extending direction of the X-axis is a left-right direction of the receptacle connector 200, and it is defined that a positive direction of the X-axis is a right direction. An extending direction of the Y-axis is a front-back direction of the receptacle connector 200. The extending direction of the Y-axis is a plugging and unplugging direction of the receptacle connector, and it is defined that a positive direction of the Y-axis is a rear direction. An extending direction of the Z-axis is a top-bottom direction of the receptacle connector 200, and it is defined that a positive direction of the Z-axis is an upward direction.

Figure 13:
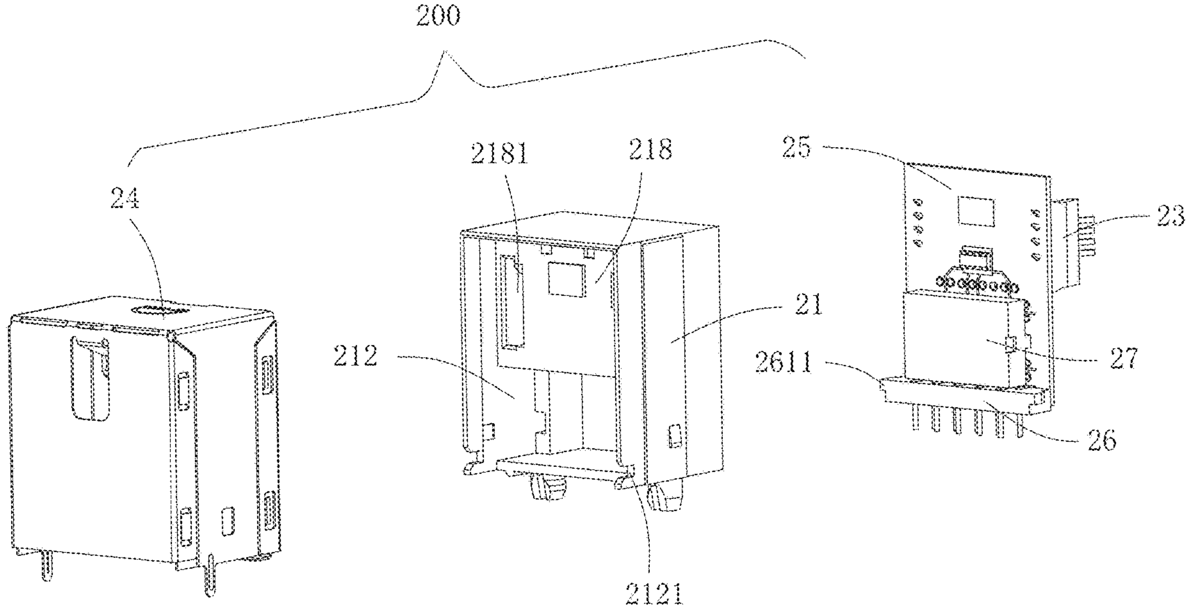
FIG. 13 is a perspective schematic view of FIG. 12 from another angle.

Referring to FIGS. 12 and 13, the insulating portion 21 includes a receiving space 212 recessed along a back-to-front direction and a mating space 213 extending forwardly from the receiving space 212. The mating space 213 extends a front surface of the insulating portion 21 so as to form a mating port. The mating space 213 includes an insertion space 216 and two locking grooves 217 extending from upper and lower sides of the insertion space 216, respectively, to be locked with the locking members 17 of the plug connector 100. The locking grooves 217 include a first locking groove 2171 extending downwardly from a lower side of the insertion space 216 and a second locking groove 2172 extending upwardly from an upper side of the insertion space 216. The first locking groove 2171 and the second locking groove 2172 have the same structure and are symmetrically arranged on the upper and lower sides of the insertion space 216 along a second direction, for example the top-bottom direction perpendicular to the first direction.

Figure 14:
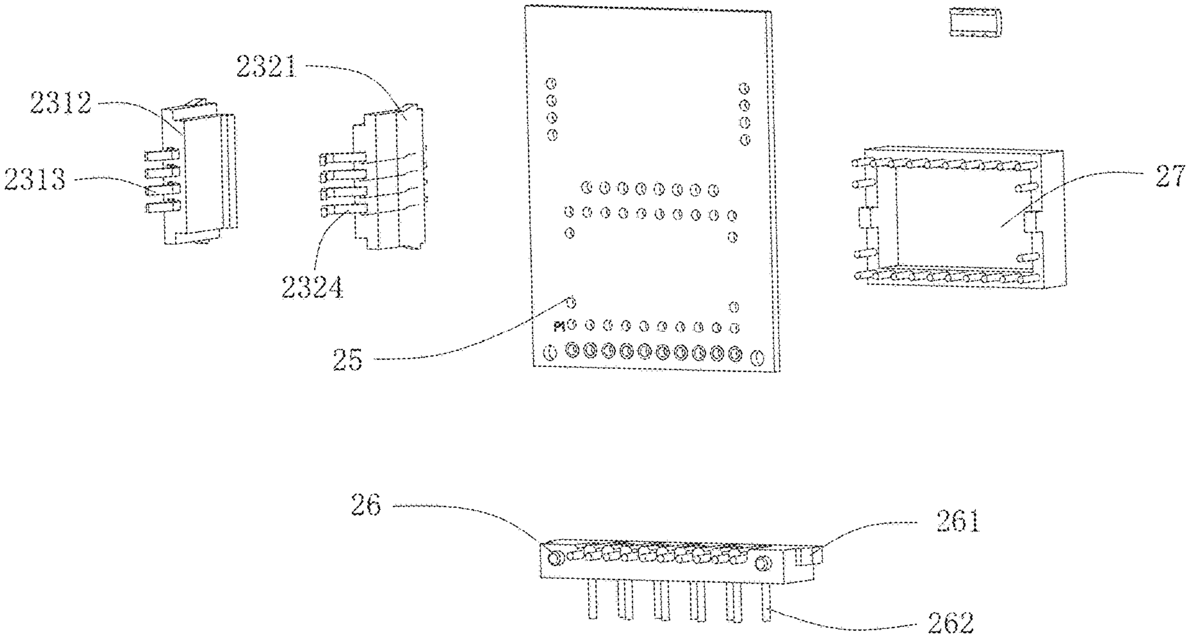
FIG. 14 is a perspective exploded view of the receptacle connector of the present disclosure with an insulating portion and the metal shell removed.
Figure 15:
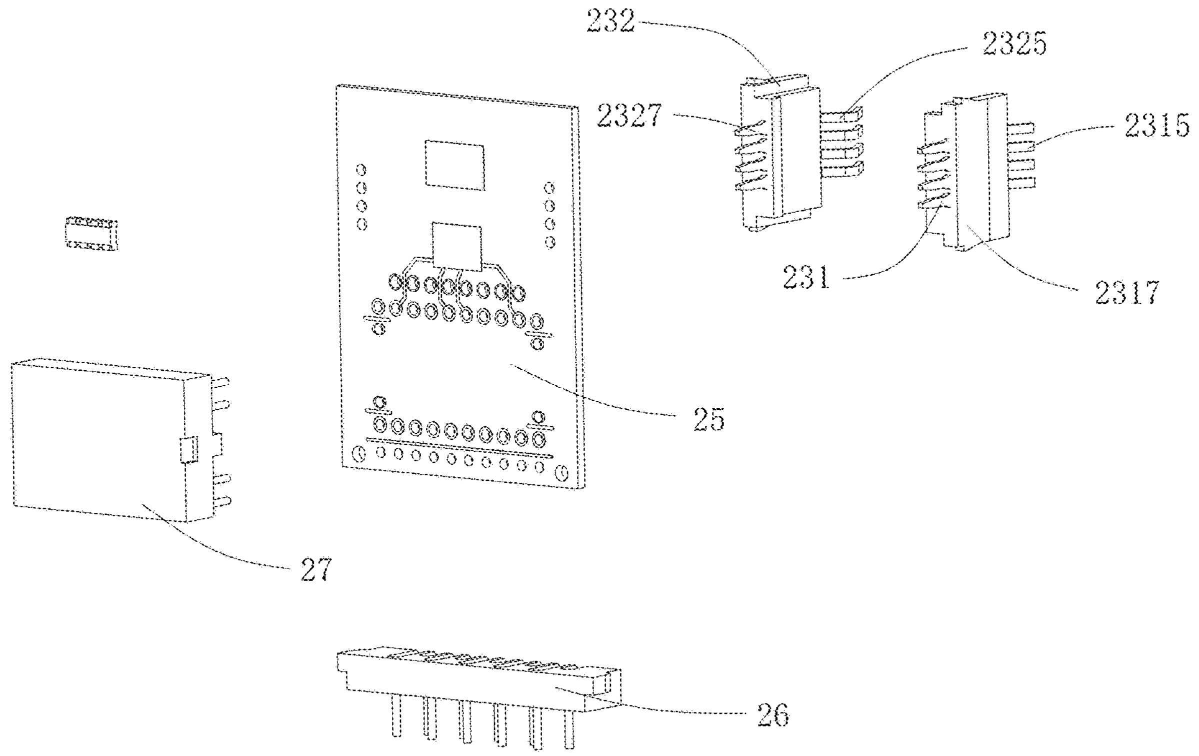
FIG. 15 is a perspective schematic view of FIG. 14 from another angle.

Referring to FIGS. 14 and 15, the receptacle terminal module 23 includes a first terminal module 231 and a second terminal module 232. The first terminal module 231 and the second terminal module 232 have the same structure and are symmetrically arranged on left and right sides of the insertion space 216 along a first direction, for example the left-right direction. The first terminal module 231 and the second terminal module 232 are electrically connected to the receptacle circuit board 25.

The first terminal module 231 includes a first terminal base 2312 and a plurality of first receptacle terminals 2313 fixed to the first terminal base 2312. The second terminal module 232 includes a second terminal base 2321 and a plurality of second receptacle terminals 2324 fixed to the second terminal base 2321.

The insulating portion 21 further includes a partition wall 218 and two mounting slots 2181. The partition wall 218 is located between the receiving space 212 and the mating space 213. The partition wall 218 is, for example, but not limited to, integrally formed inside the insulating portion 21. The two mounting slots 2181 are symmetrically arranged on opposite sides of the partition wall 218. The first terminal base 2312 and the second terminal base 2321 are disposed in the two mounting slots 2181, respectively.

Each first receptacle terminal 2313 includes an arc-shaped first mating portion 2315, a first connecting portion (not shown) extending backwardly from the first mating portion 2315, and a first soldering portion 2317 extending backwardly from the first connecting portion. Each second receptacle terminal 2324 includes an arc-shaped second mating portion 2325, a second connecting portion (not shown) extending backwardly from the second mating portion 2325, and a second soldering portion 2327 extending backwardly from the second connecting portion. The first mating portions 2315 and the second mating portions 2325 are located in the mating space 213. The first connecting portions and the second connecting portions are insert-molded with the first terminal base 2312 and the second terminal base 2321, respectively. The first soldering portions 2317 and the second soldering portions 2327 are soldered to a soldering area of the receptacle circuit board 25. The first mating portions 2315 and the second mating portions 2325 extend beyond the first terminal base 2312 and the second terminal base 2321, respectively. The first mating portions 2315 and the second mating portions 2325 are bent toward each other.

In the embodiment disclosed in the present disclosure, the first receptacle terminals 2313 are insert-molded with the first terminal base 2312. The second receptacle terminals 2324 are insert-molded with the second terminal base 2321. In other embodiments, the first receptacle terminals 2313 and the first terminal base 2312 can be formed separately and then assembled together; the second receptacle terminals 2324 and the second terminal base 2321 can be formed separately and then assembled together.

The adapter module 26 includes an adapter body 261 and a plurality of output terminals 262 fixed to the adapter body 261. One end of each output terminal 262 is soldered to the receptacle circuit board 25, and another end of each output terminal 262 extends downwardly beyond the adapter body 261. The output terminals 262 are electrically connected to the first receptacle terminals 2313 and the second receptacle terminals 2324 through the receptacle circuit board 25.

Referring to FIGS. 11 to 15, the receptacle terminal module 23 and the adapter module 26 are soldered to the receptacle circuit board 25 so as to form a terminal module. The terminal module is installed in the insulating portion 21 along a back-to-front direction. The receptacle terminal module 23 is accommodated in the mating space 213 of the insulating portion 21. The first terminal module 231 and the second terminal module 232 are symmetrically arranged on the left and right sides of the mating space 213. The receptacle circuit board 25 and the adapter module 26 are accommodated in the receiving space 212 of the insulating portion 21.

Furthermore, left and right inner side walls on opposite sides of the mating space 213 are respectively provided with a first protrusion 2131 and a second protrusion 2132 protruding toward a middle of the mating space 213. After the receptacle terminal module 23 is installed in place, the first terminal base 2312 and the second terminal base 2321 abut against the first protrusion 2131 and the second protrusion 2132, respectively, thereby preventing the receptacle terminal module 23 from moving further forward.

Furthermore, the side walls on the left and right sides of the receiving space 212 respectively have limiting grooves 2121 extending backwardly. Correspondingly, the left and right sides of the adapter body 261 are respectively provided with limiting blocks 2611. During the assembly process, the limit blocks 2611 cooperate with the limiting grooves 2121 to guide and limit the installation of the receptacle circuit board 25 and the adapter module 26.

The metal shell 24 is sleeved on a periphery of the insulating portion 21. The metal shell 24 has an accommodating space for accommodating the insulating portion 21 and an insertion port corresponding to the shape and size of the mating port. The specific structure of the metal shell 24 is a conventional structure, and the fixing method between the metal shell 24 and the insulating portion 21 is a conventional fixing method such as locking, which is not described in more detail here.

The assembly process of the receptacle connector 200 of the present disclosure is as follows. Firstly, the receptacle terminal modules 23 and the adapter module 26 are soldered to the receptacle circuit board 25 to form a terminal module. Secondly, the terminal module is installed to the insulating portion 21. Finally, the metal shell 24 is sleeved on the periphery of the insulating portion 21.

When the receptacle connector 200 is mated with the plug connector 100 in the present disclosure, the plug head 10 of the plug connector 100 is inserted into the mating space 213 of the receptacle connector 200. The first locking portion 1712 of the first locking member 171 and the second locking portion 1722 of the second locking member 172 of the plug connector 100 are locked with the first locking groove 2171 and the second locking groove 2172 of the receptacle connector 200, respectively. As a result, a stable connection between the receptacle connector 200 and the plug connector 100 is ensured.

In the illustrated embodiment of the present disclosure, the locking member 17 includes the first locking member 171 and the second locking member 172. Of course, in other embodiments, only one of the first locking member 171 and the second locking member 172 may be provided, but the locking grooves 217 still needs to be provided as two symmetrically arranged.

The first plug terminals 121 and the second plug terminals 122 of the plug connector 100 of the present disclosure have the same structure, and are symmetrically arranged on the opposite sides of the insulating body 11. Correspondingly, the first terminal module 231 and the second terminal module 232 of the receptacle connector 200 have the same structure, and are symmetrically arranged on the left and right sides of the insertion space 216. This allows the plug connector 100 to be inserted into the mating space 213 of the receptacle connector 200 in a forward direction or a reversed direction. There is no need to manually distinguish the insertion direction, thereby a blind insertion can be realized and the convenience in use is improved. In addition, the terminals are arranged scattered, which can increase the transmission speed. The first locking portion 1712 of the first locking member 171 and the second locking portion 1722 of the second locking member 172 of the plug connector 100 are symmetrically arranged on the upper and lower sides of the plug head 10. The first locking groove 2171 and the second locking groove 2172 in the mating space 213 of the receptacle connector 200 have the same structure, and are symmetrically arranged on the upper and lower sides of the insertion space 216. This makes it possible to lock the plug connector 100 and the receptacle connector 200 when the plug connector 100 is inserted into the receptacle connector 200 in either the forward direction or the reverse direction.

In the illustrated embodiment of the present disclosure, the plug connector 100 is an RJ45 plug connector 100, and the receptacle connector 200 is an RJ45 receptacle connector 200. The number of the first plug terminals 121 is four and the number of the second plug terminals 122 is four as well. The four first plug terminals 121 and the four second plug terminals 122 are symmetrically arranged on the left and right sides of the plug head 10. Accordingly, the number of the first receptacle terminals 2313 is four and the number of the second receptacle terminals 2324 is four as well. The four first receptacle terminals 2313 and the four second receptacle terminals 2324 are symmetrically arranged on the left and right sides of the insertion space 216.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A receptacle connector, comprising:

an insulating portion, the insulating portion defining a receiving space and a mating space in communication with the receiving space, the mating space extending through the insulating portion so as to form a mating port;

a receptacle terminal module, the receptacle terminal module being mounted to the insulating portion, the receptacle terminal module comprising a first terminal module and a second terminal module, the first terminal module and the second terminal module having a same structure and being symmetrically arranged on opposite sides of the mating space along a first direction;

a metal shell, the metal shell enclosing the insulating portion;

a receptacle circuit board, the first terminal module and the second terminal module being electrically connected to the receptacle circuit board; and an adapter module electrically connected to the receptacle circuit board, the adapter module comprising an adapter body and a plurality of output terminals fixed to the adapter body; wherein one end of each output terminal is electrically connected to the receptacle circuit board, and another end of each output terminal extends downwardly beyond the adapter body.

2. The receptacle connector according to claim 1, wherein the mating space comprises an insertion space, a first locking groove and a second locking groove; wherein the first locking groove and the second locking groove extend from opposite sides of the insertion space, respectively, along a second direction perpendicular to the first direction; and wherein the first locking groove and the second locking groove have a same structure and are symmetrically arranged on the opposite sides of the insertion space along the second direction.

3. The receptacle connector according to claim 2, wherein the first terminal module comprises a first terminal base and a plurality of first receptacle terminals fixed to the first terminal base; wherein the second terminal module comprises a second terminal base and a plurality of second receptacle terminals fixed to the second terminal base; and wherein the first receptacle terminals and the second receptacle terminals have a same structure and number, and the first receptacle terminals and the second receptacle terminals are symmetrically arranged on the opposite sides of the insertion space along the first direction.

4. A receptacle connector, comprising:

an insulating portion, the insulating portion defining a receiving space and a mating space in communication with the receiving space, the mating space extending through the insulating portion so as to form a mating port;

a receptacle terminal module, the receptacle terminal module being mounted to the insulating portion, the receptacle terminal module comprising a first terminal module and a second terminal module, the first terminal module and the second terminal module having a same structure and being symmetrically arranged on opposite sides of the mating space along a first direction;

a metal shell, the metal shell enclosing the insulating portion; and a receptacle circuit board, the first terminal module and the second terminal module being electrically connected to the receptacle circuit board;

wherein the first terminal module comprises a first terminal base and a plurality of first receptacle terminals fixed to the first terminal base; wherein the second terminal module comprises a second terminal base and a plurality of second receptacle terminals fixed to the second terminal base;

wherein the insulating portion comprises two inner side walls located on opposite sides of the mating space, and the two inner side walls are provided with a first protrusion and a second protrusion protruding toward a middle of the mating space, respectively; and wherein the first terminal base and the second terminal base abut against the first protrusion and the second protrusion, respectively.

5. The receptacle connector according to claim 3, wherein the insulating portion comprises a partition wall and two mounting slots, the partition wall is located between the receiving space and the mating space, the two mounting slots are symmetrically arranged on opposite sides of the partition wall along the first direction, and the first terminal base and the second terminal base are disposed in the two mounting slots, respectively.

6. The receptacle connector according to claim 3, wherein each first receptacle terminal comprises a first mating portion, a first connecting portion extending from the first mating portion, and a first soldering portion extending from the first connecting portion;

wherein each second receptacle terminal comprises a second mating portion, a second connecting portion extending from the second mating portion, and a second soldering portion extending from the second connecting portion; and wherein the first mating portion and the second mating portion are located in the insertion space.

7. The receptacle connector according to claim 6, wherein the first connecting portion and the second connecting portion are insert-molded in the first terminal base and the second terminal base, respectively; the first mating portion and the second mating portion extend beyond the first terminal base and the second terminal base, respectively; and the first mating portion and the second mating portion are bent toward each other.

8. The receptacle connector according to claim 3, wherein the one end of each output terminal is soldered to the receptacle circuit board.

9. The receptacle connector according to claim 1, wherein the receptacle circuit board and the adapter module are accommodated in the receiving space of the insulating portion.

10. The receptacle connector according to claim 1, wherein the insulating portion comprises two side walls located on opposite sides of the receiving space along the first direction, and each side wall comprises a limiting groove extending in a direction toward the adapter body; and wherein each of opposite sides of the adapter body is provided with a limiting block which mates with the corresponding limiting grooves.

11. A receptacle connector, comprising:

an insulating portion, the insulating portion defining a receiving space and a mating space in communication with the receiving space, the mating space extending through the insulating portion so as to form a mating port;

a receptacle terminal module, the receptacle terminal module being mounted to the insulating portion, the receptacle terminal module comprising a first terminal module and a second terminal module, the first terminal module and the second terminal module being arranged on opposite sides of the mating space, the first terminal module comprising a first terminal base and a plurality of first receptacle terminals fixed to the first terminal base, the second terminal module comprising a second terminal base and a plurality of second receptacle terminals fixed to the second terminal base; and a receptacle circuit board, the first receptacle terminals and the second receptacle terminals being electrically connected to the receptacle circuit board;

wherein each first receptacle terminal comprises a first mating portion protruding into the mating space, and each second receptacle terminal comprises a second mating portion protruding into the mating space;

wherein the first mating portions of the first receptacle terminals and the second mating portions of the second receptacle terminals are symmetrically arranged on opposite sides of the mating space along a first direction; and wherein the insulating portion comprises a partition wall and two mounting slots, the partition wall is located between the receiving space and the mating space, the two mounting slots are symmetrically arranged on opposite sides of the partition wall along the first direction, and the first terminal base and the second terminal base are disposed in the two mounting slots, respectively.

12. The receptacle connector according to claim 11, wherein the mating space comprises an insertion space, a first locking groove and a second locking groove; wherein the first locking groove and the second locking groove are disposed on opposite sides of the insertion space, respectively, along a second direction perpendicular to the first direction; and wherein the first locking groove and the second locking groove are symmetrically arranged on the opposite sides of the insertion space along the second direction.

13. The receptacle connector according to claim 12, wherein the first receptacle terminals and the second receptacle terminals have a same structure and number, and the first receptacle terminals and the second receptacle terminals are symmetrically arranged on the opposite sides of the insertion space along the first direction.

14. The receptacle connector according to claim 13, wherein the insulating portion comprises two inner side walls located on opposite sides of the mating space along the first direction, and the two inner side walls are provided with a first protrusion and a second protrusion, respectively; and wherein the first terminal base and the second terminal base abut against the first protrusion and the second protrusion, respectively.

15. The receptacle connector according to claim 13, wherein each first receptacle terminal comprises a first connecting portion extending from the first mating portion, and a first soldering portion extending from the first connecting portion;

wherein each second receptacle terminal comprises a second connecting portion extending from the second mating portion, and a second soldering portion extending from the second connecting portion; and wherein the first mating portion is arc-shaped, the second mating portion is arc-shaped, and the first mating portion and the second mating portion are located in the insertion space.

16. The receptacle connector according to claim 15, wherein the first connecting portion and the second connecting portion are insert-molded in the first terminal base and the second terminal base, respectively; the first mating portion and the second mating portion extend beyond the first terminal base and the second terminal base, respectively; and the first mating portion and the second mating portion are bent toward each other.

17. The receptacle connector according to claim 13, further comprising an adapter module electrically connected to the receptacle circuit board, the adapter module comprising an adapter body and a plurality of output terminals fixed to the adapter body; wherein one end of each output terminal is soldered to the receptacle circuit board, and another end of each output terminal extends downwardly beyond the adapter body.

18. The receptacle connector according to claim 17, wherein the receptacle circuit board and the adapter module are accommodated in the receiving space of the insulating portion.

19. The receptacle connector according to claim 17, wherein the insulating portion comprises two side walls located on opposite sides of the receiving space along the first direction, and each side wall comprises a limiting groove extending in a direction toward the adapter body; and wherein each of opposite sides of the adapter body is provided with a limiting block received in the corresponding limiting grooves.

20. The receptacle connector according to claim 4, further comprising an adapter module electrically connected to the receptacle circuit board, the adapter module comprising an adapter body and a plurality of output terminals fixed to the adapter body; wherein one end of each output terminal is electrically connected to the receptacle circuit board, and another end of each output terminal extends downwardly beyond the adapter body.

* * * * *